United States Patent
Ophir et al.

(10) Patent No.: US 9,949,130 B2
(45) Date of Patent: Apr. 17, 2018

(54) DATA SECURITY FOR INTERNET OF THINGS (IOT) DEVICES

(71) Applicant: StarHome Mach GmbH, Zurich (CH)

(72) Inventors: Shai Ophir, Moshav Ein-Vered (IL); Shlomo Wolfman, Hod-HaSharon (IL)

(73) Assignee: StarHome Mach GmbH, Zurich (CH)

( * ) Notice: Subject to any disclaimer, the term of this patent is extended or adjusted under 35 U.S.C. 154(b) by 0 days.

(21) Appl. No.: 15/422,519

(22) Filed: Feb. 2, 2017

(65) Prior Publication Data

US 2017/0230832 A1    Aug. 10, 2017

Related U.S. Application Data

(60) Provisional application No. 62/294,301, filed on Feb. 12, 2016, provisional application No. 62/290,975, filed on Feb. 4, 2016.

(51) Int. Cl.

| | |
|---|---|
| *H04W 4/70* | (2018.01) |
| *H04W 12/08* | (2009.01) |
| *H04W 4/00* | (2018.01) |
| *H04W 8/20* | (2009.01) |
| *H04L 12/46* | (2006.01) |
| *H04L 29/08* | (2006.01) |
| *H04W 84/04* | (2009.01) |

(52) U.S. Cl.
CPC ......... *H04W 12/08* (2013.01); *H04L 12/4633* (2013.01); *H04L 67/2819* (2013.01); *H04W 4/005* (2013.01); *H04W 4/70* (2018.02); *H04W 8/20* (2013.01); *H04W 84/042* (2013.01)

(58) Field of Classification Search
CPC ......... H04W 74/00; H04W 5/00; H04W 8/08; H04W 12/06; H04W 4/005; H04W 8/12; H04W 8/20; H04W 72/08; H04M 3/42; H04L 4/50
See application file for complete search history.

(56) References Cited

U.S. PATENT DOCUMENTS

| | | | |
|---|---|---|---|
| 2016/0366635 A1* | 12/2016 | Cui | H04W 48/04 |
| 2017/0148018 A1* | 5/2017 | Levin | G06Q 20/202 |
| 2017/0272972 A1* | 9/2017 | Egner | H04W 28/0268 |

* cited by examiner

*Primary Examiner* — Diane Mizrahi

(57) ABSTRACT

System for monitoring of IoT data traffic between an IoT device connected via a cellular network and a server using Internet Protocol (IP), where the IP addresses are dynamically assigned and thus do not identify the devices. The system uses a device on the cellular network that extracts cellular identification of an IoT device involved in a data communication session and IP identification of the data communication session. The device matches the cellular identification with the IP identification. A database has device security profiles for IoT devices which can be retrieved per device via the cellular identification. Then, an enforcement unit identifies the session using the IP address and allows traffic only if the traffic conforms with the device security profile which was retrieved using the cellular identification.

20 Claims, 6 Drawing Sheets

DATA SECURITY FOR INTERNET OF THINGS (IOT) DEVICES

RELATED APPLICATIONS

This application claims the benefit of priority under 35 USC § 119(e) of U.S. Provisional Patent Application Nos. 62,290,975 filed on Feb. 4, 2016 and 62/294,301 filed on Feb. 12, 2016, the contents of which are incorporated by reference as if fully set forth herein in their entirety.

FIELD AND BACKGROUND OF THE INVENTION

The present invention, in some embodiments thereof, relates to a system and method for data security for devices that form part of the Internet of things (IoT) and, more particularly, but not exclusively, to data security for those IoT devices whose connections pass at least partially via the cellular network.

The development of the IoT (Internet of Things) and M2M (Machine to Machine) is imposing new challenges for the cyber industry in general, and for mobile operators in particular. By machine-to-machine we refer to devices which communicate principally with other devices, including for example smart utility meters, health-care devices, monitoring devices, vehicles, networked security monitors and alarms, traffic management devices, domestic appliances, monitors and alarms belonging to building management systems, and monitors, alarms and other components belonging to smart home systems and networked devices in general. By IoT we mainly, but not exclusively, refer to M2M devices which are connected via the internet. Not all IoT devices communicate solely with other machines. Many such devices have profiles that allow users to interface with them and a device that is mainly an M2M device may also have a user interface, generally to allow for updates, reprogramming, bug identification and the like, although day to day communication and reporting would be machine to machine. Many IoT devices do report to end users, and thus these definitions are not limiting.

The present disclosure relates to devices, generally but not exclusively other than those for communication between people such as telephones, which are networked via a mobile network, having a SIM card or like network authentication system and use an IMSI or like cellular network number, as the entity of identification. An international mobile subscriber identity (IMSI) is a unique number, usually fifteen digits long, associated with the Global System for Mobile Communications (GSM) and Universal Mobile Telecommunications System (UMTS) and LTE (4G) and 5G cellular network types, as well as other networks such as NB-IoT and LTE-M which are designed for IoT/M2M devices specifically. The IMSI is a unique number identifying a GSM subscriber and corresponding numbers may be used in non-GSM networks. In some cases a particular device can be both an IoT device and a device for communication between people. For example a mobile telephone may include a health tracker feature that reports to a medical center.

The challenge for IoT devices in terms of security is tremendous, because hackers can get into a device and carry out significant damage. For example a health care device may apply timed pulses to the heart, or an IoT device may operate the brakes in a vehicle, and outsiders have made attempts to hack such devices. Another example is a temperature sensor in a data center, whose output is used to control the air conditioning. The temperature sensors can be hacked to indicate that the temperature is very low, thus switching off the air conditioning. The data center is thus caused to overheat very quickly and considerable data can be lost.

There is considerable research taking place today to prevent intrusion and hacking into IoT devices, and from the devices into other machines or data centers or other entities connected to the Internet.

The mobile operator has a specific role in the security scenario, because it controls the pipe for all mobile devices served by the cellular network. The cellular network may refer to GSM, CDMA, 2G, 3G, 4G, 5G, LTE, LTE+, and successors thereof, and indeed any other wireless networks operated as a mobile network, including local and citywide wifi and the like. The mobile operator thus provides services for the business entities (the verticals) that are the service providers of the health-care devices, or the vehicles, or any other devices and may be considered to have security responsibility.

Today, a mobile network usually provides the same level of security to all mobile devices being served by the network, whether communication devices, IoT devices or anything else. The network authorizes the SIM card via the GSM/2G/3G/4G authentication mechanism. The network may be secured by firewalls and other security gateways installed at the network borders, monitoring the data traffic going between the mobile network and the internet, and/or between the mobile network and other networks or signaling carriers.

However the IoT (Internet of Things) industry imposes new security requirements both for the internet and for the mobile network. Security is a crucial component in IoT services, since these are physical devices and machines, and hacking such devices may cause direct physical damage to the machines or the environment in which they serve, and the humans being served by those machines, as already mentioned in the above.

IoT devices are generally autonomous, which means there is no human to notice that something is wrong, and the devices have small processors and limited computing resources. The IoT devices are themselves protected by a SIM card but are generally connected to an IP-based server at the other end so that SIM card security does not authenticate the other end of the communication. Internet firewalls generally look for viruses and check for suspicious packets, but the type of packets the firewalls look for are based on general computing devices and networking. To identify a suspicious packet in the context of a particular IoT device the firewall would have to know what the device is and what it is supposed and not supposed to do. Generally the only information available to the firewall to make such an identification is a dynamically assigned mobile network IP address, which does not identify anything to the firewall.

Thus what is essentially happening is that although both cellular and Internet parts of the route are in themselves secure, a gap exists between the two parts of the route that a hacker is able to exploit.

One application of IoT devices relates to devices in a particularly identified local area, such as an airport, seaport, a campus, or a smart city. The IoT service providers of such a "smart area", (area being served by IoT devices, such as smart meters, cameras etc., usually named "Smart"), need to be in control of all traffic going to and from the IoT devices which compose the service, and are installed in the area being served.

Thus for example an attempt to hack a seaport and take over say the cranes could lead to dangerous havoc. An attempt to hack a city and take over the traffic lights could likewise lead to dangerous havoc.

The service providers may also require to track mobile devices, say vehicles, entering the area, and even personal mobile subscribers that penetrate the area under the service, and may be a threat.

As of today, a mobile network cannot isolate a specific geographical zone from the entire mobile network, as indicated in the above.

SUMMARY OF THE INVENTION

The present embodiments use cellular network identification, such as an IMSI, to identify the specific IoT device involved in a communication session and, based on the cellular identification, find a corresponding security profile that is expected of the specific IoT device. At the same time, the IP address assigned to the device for the specific session is identified so that the security profile can be applied to the session. Communication in the corresponding session is then required to correspond to the profile. The security profile may be sent to a firewall in an IP network together with the IP address so that the firewall may identify packets belonging to the session and manage the packets of that specific IoT device session according to the profile. Alternatively, the cellular network may operate its own packet inspection to enforce the profile within the cellular network, without needing to rely on external firewalls. IoT Devices may be grouped according to geographical zones such as seaports or airports, either through pre-registration or through the location features available to a cellular network, so that sensitive zones can be managed using suitable zone profiles.

According to an aspect of some embodiments of the present invention there is provided a system for monitoring of IoT data traffic between an IoT device connected via a cellular network and a server using Internet Protocol (IP), comprising:

at least one network server on the cellular network configured to extract cellular identification of an IoT device involved in a data communication session and to extract IP identification of the data communication session and match the cellular identification with the IP identification;

a database comprising device security profiles for IoT devices, a security profile corresponding to a current IoT device being retrievable from the database via the cellular identification; and an enforcement unit to allow respective traffic in the session of the current IoT device, the session being identified by the Internet protocol identification, only if the traffic conforms with the device security profile retrieved by the database using the cellular identification.

In an embodiment, the security profiles define one or more of the following:

IP addresses to whom the IoT device is allowed to connect;

IP addresses to whom the IoT device is allowed to provide write access;

IP addresses to whom the IoT device is allowed to provide read access;

Allowed message lengths;
Allowed message formats;
Allowed instructions;
Allowed message content;
Disallowed message content; and
Allowed connection durations.

In an embodiment, the at least one network server to extract cellular information is connected to a tunnel between first and second data traffic gateways of the cellular network.

In an embodiment, the first gateway is an SGSN or an S-Gateway, the second gateway is a GGSN or a P-gateway, and the tunnel is a GPRS tunneling protocol (GTP) tunnel.

In an embodiment, the cellular identification is an International Mobile Subscriber Identity (IMSI) and the IP identification is an IP address assigned to the IoT device.

In an embodiment, the first and second data traffic gateways are on a single cellular network.

In an embodiment, a first of the data traffic gateways is on a roaming network of the IoT device and a second of the data traffic gateways is on a home network of the IoT device. In the same way, both gateways may be on roaming networks.

In an embodiment, the at least one network server to extract the cellular identification and connected to the tunnel comprises a probe.

In an embodiment, the at least one network server to extract cellular identification and connected to the tunnel comprises at least one proxy server.

In an embodiment, the at least one network server to extract cellular identification comprises a first, control plane, proxy server.

In an embodiment, the first, control plane, proxy server, interfaces with the enforcement unit.

An embodiment may comprise a second, data plane, proxy server for intercepting data packets of a session identified by the control plane proxy server.

In an embodiment, the first, control plane, proxy server is configured to obtain the cellular identification and the IP identification and the second, data plane, proxy server is configured to extract session data, the second, data plane, proxy server acting as the enforcement unit for enforcing of the security profile on the session data.

In an embodiment, the enforcement unit comprises an Internet firewall, the firewall being configured to apply dynamically supplied rules to an identified session.

In an embodiment, respective IoT devices are allocated data sessions via dynamically assigned Internet protocol addresses.

The system may be configured to group IoT devices within a predefined zone and to constrain communication devices within the zone according to a predefined zone security profile.

The system may identify IoT devices belonging to the predefined zone according to a predetermined indication and further IoT devices not indicated by the predetermined indicator but being located within a geographical boundary of the zone.

The system may use cell identification to find a location of a mobile or IoT device and determine whether the device is within the zone.

At least some of the IoT devices are provided with access point names (APN), the system being configured to resolve the APNs to identify a proxy server within the system.

In an embodiment, at least some of the IoT devices are provided with an APN that resolves to a control plane proxy server.

According to a second aspect of the present invention there is provided a cellular network providing Internet Protocol-based data sessions for IoT devices identifiable by cellular identification; the network comprising:

a monitoring platform configured to detect the setting up of an IoT device data session for an IoT device on the network and to determine a cellular identity for the device and an IP identity for the session;

a database comprising security profiles for respective IoT devices on the network, the profiles being retrievable via respective cellular identities;

an enforcement network server able to inspect packets belonging to data sessions and enforce rules, the enforcement device being connected to receive IP identities obtained by the monitoring platform and corresponding security profiles and to enforce respective security profiles over communication sessions indicated by corresponding received IP identities, thereby to provide security for IoT devices on the network.

According to a third aspect of the present invention there is provided a method of securing IoT devices communicating via IP based data sessions identified by IP addresses, the communicating being over a cellular network wherein devices are identified by a cellular identification, the method comprising:

detecting setting up of communication sessions with an IoT device;

extracting a cellular identification of the IoT device through the setting up;

extracting an IP address identifying the session being set up;

using the cellular identification to obtain a device security profile defining allowed and disallowed communications with the IoT device;

using packet inspection, of packets identified by the IP address identifying the session, to determine whether the device security profile is being complied with in the session; and if the device security profile is not being complied with in the session then taking enforcement action against the session.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer, or by a processor, say within an IoT device, using any suitable operating system, Android being an operating system commonly found in such devices. In an exemplary embodiment of the invention, one or more tasks according to exemplary embodiments of method and/or system as described herein are performed by a data processor, such as a computing platform or an IoT device, for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well, and is typically available at least some of the time to an IoT device. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
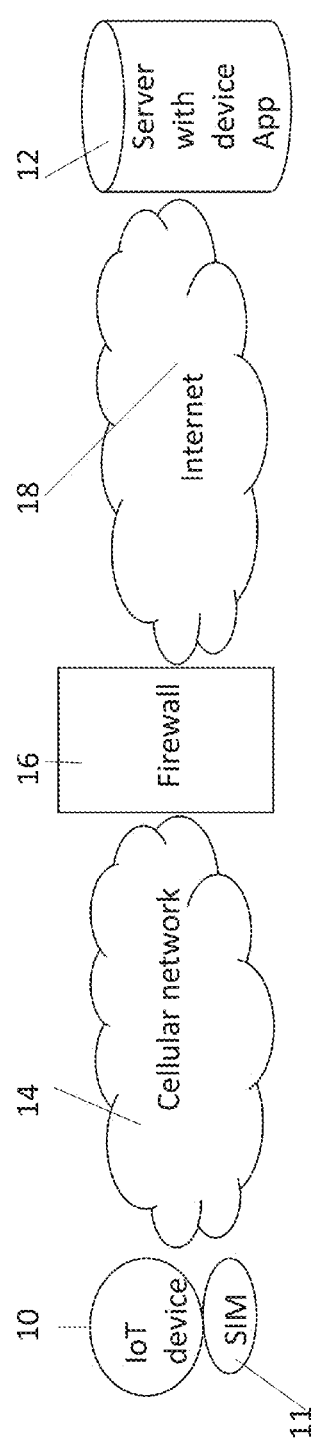
FIG. 1 is a simplified block diagram illustrating conventional communication paths between an IoT device and an application server.

The present invention, in some embodiments thereof, relates to a system and method for data security for the Internet of things (IoT) and, more particularly, but not exclusively, to data security for those IoT devices that are connected via the cellular network.

IOT devices generally have SIM cards and are connected via the cellular network and the Internet, to an application or enterprise server to which they report or which updates or manages them.

In some cases, IoT devices may be connected via dedicated low bandwidth networks, say which are provided in a metropolitan area for sensors for utility meters and the like. Although the present methods may be applied to such networks, the primary concern of the present methods is devices that connect via the cellular network.

The cellular network itself has very good security, and the Internet part of the link provides a firewall. The firewall identifies and excludes viruses and certain types of hacking attack. The firewall however does not know anything specific about the IoT device it is communicating with.

In general, IOT devices are very specific in who they are supposed to talk to and what kinds of instructions they are supposed to receive. So in general it should be possible to spot hacking attempts by looking for messages that do not fit in with expectations. Unfortunately, though, the firewall is unable to take advantage of the specificity of the device since it is located on the Internet, or in any event is an IP-based device, and the only identifying information about the IoT device that is available to the firewall and the packets that are inspected by the firewall, is an IP address. The IP address is most likely a dynamically assigned IP address which does not give the firewall any specific information about the device.

Now the firewalls may be provided by the cellular operator at the cellular-Internet portal, or by the enterprise at the server. The firewalls provide general protection based on typical Internet behavior but can do nothing specific for IoT devices without information about the specific device.

The cellular network by contrast with the IP communication layer, has the identification of the specific device. Verified identifications such as the IMSI are available within the cellular network, although such identifications are not passed on outside the cellular network and carry no meaning outside the cellular network, so that even if the IMSI numbers were passed on to the firewall, the firewall would not know how to take advantage. That is to say, in an IP network, data packets are identified by source and destination, and contain content, and an IMSI number carries no meaning.

The present embodiments may enhance the firewall. In the cellular network the IoT traffic, like other data traffic, is passed between the S-gateway and P-gateway (for 4G) or between the SGSN and the GGSN (for 2G and 3G) via a secure tunnel and then GPRS to the device itself. Outgoing data from the IoT device is organized into IP packet sessions at the SGSN or S-gateway. It is noted that the tunnel may be between two parts of the same network, or, in the case of roaming, between two different networks. Thus the S-gateway or SGSN may be in a roaming network and the GGSN or P gateway may be on the home network, or indeed on another roaming network, and big enterprises may even have their own GGSN or P-gateway.

From the GGSN or P-gateway, the connection to the enterprise or application server goes via the cellular provider's Internet port and then to the enterprise itself via the Internet or via a VPN secured tunnel (which can be carried over the internet as well or via private lines).

The present embodiments monitor the signals in the cellular part of the network, to find sessions being set up. The cellular device identification and the dynamically assigned IP address are both extracted from the session, and the cellular device identification is used to find a security profile for the specific device and then deliver that profile to the firewall along with the IP address. The firewall uses the IP address to identify packets belonging to the session and uses packet inspection to ensure that the identified packets observe the profile. The profile may be composed of the allowable IP address for the device as destinations and source addresses, as well as the possible formats of the messages being sent to the from the device.

In an embodiment, monitoring is carried out within the tunnel, by either a probe or a relay proxy.

In the case of the relay proxy, two proxies may be used. The first is a GTP-C proxy for control signaling, to identify session set up and find the cellular identification and IP address. The second is a GTP-U proxy, which looks for the session data. The GTU proxy may be associated with the firewall for carrying out packet inspection and enforcing the profile, so that there is no need to rely on an external firewall.

In general, an IoT device sends or receives a communication, opening a new session which causes the PDP context, or equivalent command in non GSM networks, to open a new tunnel. The GGSN assigns a dynamic IP address to the IoT device that wants the session, and since the IP address is assigned dynamically, the firewall is unable to identify the device, as discussed. The firewall may in theory know about the range of IP addresses available to the GGSN for IoT devices, so that it would be able to determine that an IoT device was involved but even so the firewall would not be able to identify the specific device or device type.

However the probe or proxy is able to obtain an explicit identification of the device, such as the IMSI, which does not reach the regular firewall, as cellular identification is not placed inside the data packets.

However the IMSI itself does not tell the firewall anything as firewalls know only the Internet protocols and know nothing about cellular telephone numbers. For this purpose a database is kept in which the IMSI or other cellular identification in use provides a key. The enterprise employing the IoT device may then place in the database an entry for the device, which may include expected messages and allowed sources that the IoT device may talk to. Such an entry is referred to herein as the device security profile. An enterprise may have the same security profile for many devices or may have different profile for different devices, as desired, and may have ways of dynamically changing the profile.

Thus, although the cellular identification itself is meaningless to the firewall operation, the device security profile, as provided together with an IP address that identifies the session, may be enforced by the firewall on the corresponding IoT device session. Thus the firewall is effectively told that session X based on IP address Y is allowed to communicate only according to the specific device profile provided.

The firewall receives the device security profile and applies the rules in the profile dynamically as a set of one or more rules for the new session. The firewall may be provided with a dynamic applicative firewall API which generally allows profiles to be applied for specific sessions.

The device security profile may comprise a table of allowable message formats, allowable packet lengths, allowable session lengths, allowable source IP addresses and ports with which communication is allowed and the like. One security feature that the table may define is that particularly sensitive commands, such as resetting of the device, are only allowed if the session has already included a pre-specified error message sent by the IoT device. Thus the device can only be reset after signaling an error, and the device is protected by arbitrary resets.

The device profile may need to be changed from time to time and the table can be amended, under suitable security safeguards. For example, a device undergoing scheduled maintenance may have session safeguards temporarily lowered for the duration of the maintenance, and this may be achieved by temporarily relaxing the rules in the profile. Likewise, it may often be desirable to change the predefined maximum packet length because a new feature has been added to the device. Following the changes, the most current device communication profile is sent to the database and from there to the firewall upon opening of a session.

The probe or proxy is also able to detect the session end so that the firewall can be instructed to dispose of the device profile. In this way firewalls do not inadvertently use out of date profiles.

A zone may be defined as a layer above the detection of the IoT device. Thus all IoT devices within a certain perimeter or belonging to a certain operator may be defined as a secure zone to which particular rules apply. In addition, mobile devices entering the graphical boundaries of the zone may be subject to certain rules, based on cell Identification and base station connections. Thus a seaport or an airport or like institution which is subject to specific security issues may be defined as a secure zone. Hence, the present embodiments may provide a wireless secured zone, where all data generated by mobile devices in general and IoT devices in particular, which are located in the zone may be monitored and potentially analyzed for threats.

The present embodiments may therefore identify and isolate a sub-network of the mobile network, in terms of data security, creating a secured zone within the mobile network, a mobile militarized zone, where data sessions of mobile devices covered in the specific area may be further inspected for security risks. The mobile secured zone may thus form a closed mobile sub-network, a mobile LAN (Local Area Network), forming an island within the public mobile network.

Such a sub-network entity may serve entities that require a secured zone. The devices under coverage may be IoT devices and personal subscribers as well. The devices may have a SIM card with a local (domestic) identity of the Home Public Mobile network (HPMN), or an identity of another HPMN, where the devices are roaming in the HPMN serving the secured zone. In the latter case, the serving network is the VPMN (Visited Public Mobile Network) for these roaming devices, which are Inbound Roamers in the VPMN. The devices can be in a temporary or permanently roaming situation, where the identity can be dynamically replaced with a local identity, using SIM download mechanisms which involve downloading a new identity to an existing SIM card.

For purposes of better understanding some embodiments of the present invention, as illustrated in FIGS. 2-5 of the drawings, reference is first made to the construction and operation of a standard IoT cellular connection as illustrated in FIG. 1.

As shown in FIG. 1, IoT device 10, with SIM card 11, connects to application server 12 via cellular network 14, an Internet Protocol (IP) firewall 16 and Internet connection 18.

Within the cellular network the IoT device is individually identified with a cellular number such as an IMSI. Over the Internet connection the IoT device is not identified but rather the IP session is identified based on the source and destination IP addresses. The IoT device however is very unlikely to have a fixed IP address. Most IoT devices communicate very rarely so a small number of IP addresses that can be dynamically assigned may serve a large number of IoT devices.

As a result firewall 16 is unable to obtain any information about the specific IoT device involved in any communication session and can only apply general firewall rules to the session.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
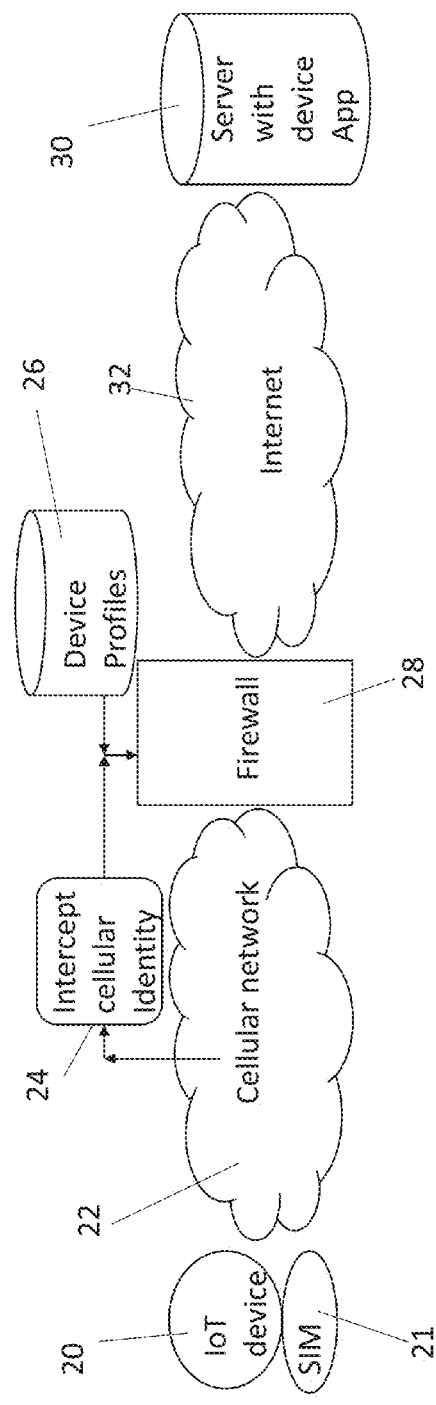
FIG. 2 is a simplified block diagram showing a secure communication path according to an embodiment of the present invention.

Reference is now made to FIG. 2, which is a simplified block diagram that illustrates a first embodiment of the present invention. IoT device 20 connects to cellular network 22 using a SIM card 21. The cellular network assigns a session to the IoT device, and the IoT device is associated with an IP address. As discussed, in most cases the IP address is dynamically assigned so that it contains little information about the identity of the IoT device. The cellular network however does explicitly identify the IoT device in order to allow use of the network, and this identity is detected by an intercept unit 24. The cellular identity is then used as a look up key in database 26 which contains device security profiles for different devices. The profiles define who the device is allowed to communicate with and what kinds of messages are allowed. The profile may be as simple or as complex as necessary. Thus an IoT device in a car may be allowed only to report, and may not receive external commands at all, unless the car is undergoing maintenance. A device in a smart home may be allowed any messages from the server of the service provider but only limited messages from the user interface. It is noted that the database 26 need not be located on the network, or may be located either on the cellular network or on the Internet or other IP network, or may be cloud based.

The device security profile is forwarded to the firewall 28 together with the IP address, and the firewall is now able to match the profile with the session based on the dynamically assigned IP address. The session is forwarded to the destination, typically but not necessarily server 30 with the provider's application for the device. Other legitimate destinations for IoT communication sessions may apply to specific devices, and may be identified as such in the profile. The session is typically forwarded via an IP-based connection 32 such as the Internet.

The firewall obtains the device profile and ensures that the current session is in accordance with the profile. Thus the firewall ensures that the IoT device is talking only to an authorized destination and that the authorized destination is only making requirements of the IoT device 20 that are allowed by the profile.

Figure 3:
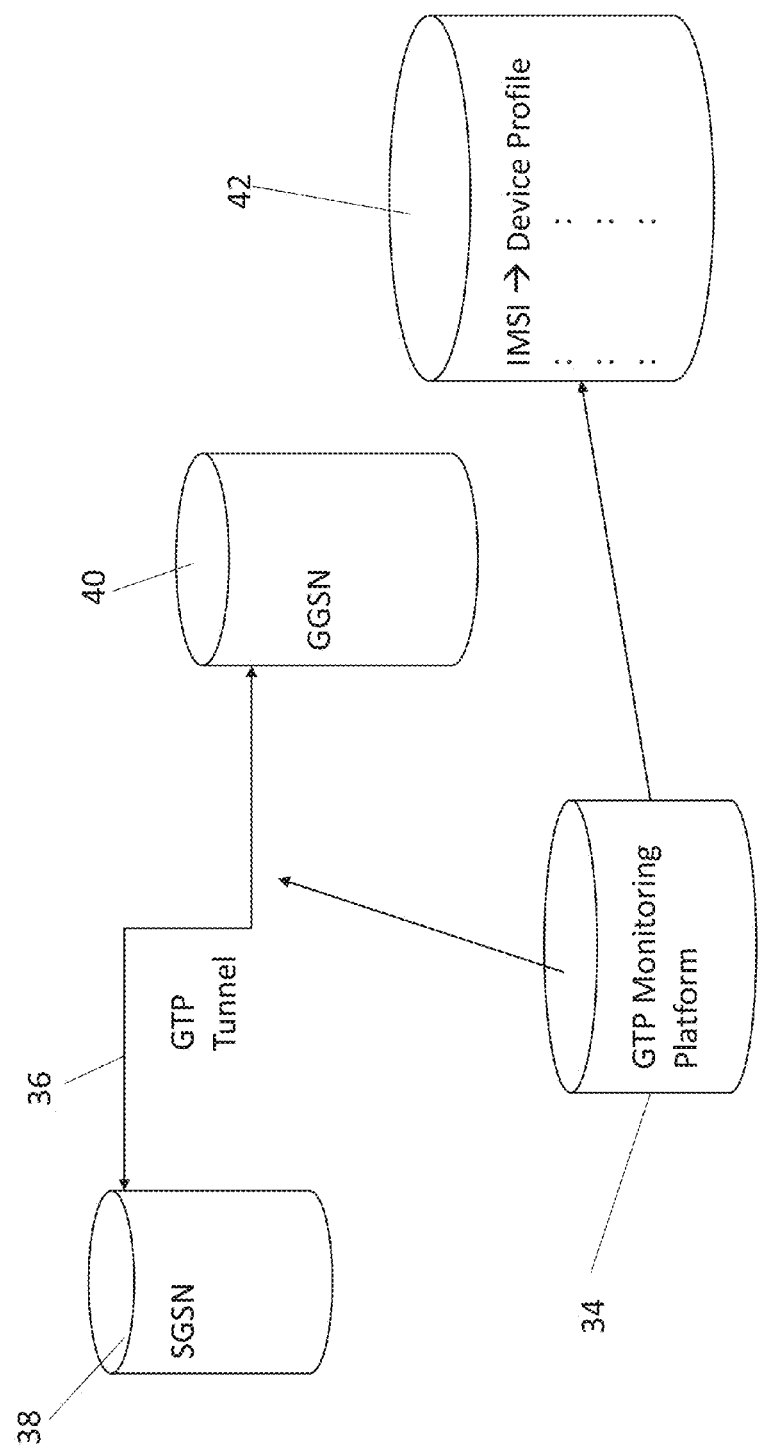
FIG. 3 is a simplified block diagram showing a part of the secure communication path of FIG. 2.

Reference is now made to FIG. 3, which illustrates a part of the cellular network of FIG. 2 and shows an exemplary way in which IoT communications sessions may be monitored. The present embodiments may be based on the GPRS Tunneling Protocol (GTP), which is a group of IP-based communications protocols used to carry general packet radio service (GPRS) within GSM, UMTS and LTE networks. In 3GPP architectures, GTP interfaces are specified on various interface points. In the present embodiments, a GTP monitoring platform 34 may be located on a GPRS Tunneling Protocol (GTP) link 36 between the SGSN 38 and the GGSN 40, in a 2G/2G mobile network. In the case of an LTE network the equivalent entities between which the tunnel is formed are the S-GW and the P-GW. Other parallel entities in other types of wireless networks work in similar manner, including tunneling according to the MIP/PMIP protocol in CDMA networks.

The GTP tunnel 36 may control and/or carry the data streams going to and from the various connected mobile IoT devices served by the network, and the service provider of that device, or the Internet, or any other backend server connected to that device and with which the device communicates. As mentioned, a tunnel may be defined by an SGSN in one network and a GGSN in another network.

As will be discussed with reference to FIGS. 4 and 5, the monitoring platform 34 may be either a GTP-Relay/Proxy, or a GTP-Probe. The first is an intrusive platform, which has control of the GTP messages, and may thus relay the messages to the SGSN/GGSN or block or even modify the messages. In order to act as a proxy, the monitoring platform may insert the IP address of the platform as the proxy for the messages, thus ensuring that responses to the messages also go via the platform.

On the other hand, the probe is a passive unit, which only reads the messages, but does not modify them.

The monitoring platform, irrespective of whether it is a probe or a proxy, monitors the messages, and may identify the pair {IMSI, IP-address of a device}, where the IMSI is the mobile network identifier, and the IP address is dynamically allocated to the IoT device by the GGSN/P-GW as a response to a Create-PDP-Context request sent by the SGSN. More generally, the pair may be any cellular network identification of the device combined with an Internet protocol (IP) address that can be used to identify the session, so that the pair can be used outside the cellular network to tie the specific IoT device to the particular session.

Thus the monitoring platform 34 is a device on the cellular network which extracts cellular identification of an IoT device involved in a data communication session and also extracts IP identification of the data communication session. The platform then matches the cellular identification with the IP identification.

The dynamic allocation of the IP address is typically made in response to a request for a data session. The request may be initiated by the device if the device initiates the session, or by the network if something outside the network attempts to communicate with the device. After identifying the pair, the monitoring platform 34, which contains the GTP-Relay/Proxy or GTP-Probe, and other components, may access information database 42, which contains the relevant information for the given device identification, typically the IMSI. The database 42 holds device security profiles for IoT devices, which are retrievable using the cellular identification as the retrieval key. The device profile contains information which is provided typically by the IoT device operator and indicates which IP addresses are allowed to communicate to or from the current device, and which IP addresses have different levels of resetting and reprogramming privileges, or mere read only access etc. In embodiments, the profile may be updated dynamically, as greater privileges may be applied temporarily, say during a maintenance period. More particularly but not exclusively, the security profile may include IP addresses to whom the IoT device is allowed to connect, IP addresses to whom the IoT device is allowed to provide write access, IP addresses to whom the IoT device is allowed to provide read access, allowed message lengths, allowed and disallowed message formats, allowed and disallowed instructions, allowed and disallowed message content and allowed connection durations. The profile may further define groups and zones to which the IoT device belongs, as will be discussed in greater detail below and may identify the service provider associated with the IoT device.

As an optional value, the device profile may include information defining specific data formats allowed to be sent and received by the given device. The general idea is that IoT devices are machines, hence they are limited to a pre-defined set of messages having specific data formats. The set may be updated as needed, but at any given time there is a known set of messages that the device is expected to send and receive. The device IP address thus identifies a given session, and the identified session may then be controlled according to the device security profile. The profile defines allowable servers, allowable IP addresses, and the allowable levels of access and formats of the messages. All that remains is for an element to be provided which performs data inspection of IP packets of the session, namely the packets that are sent and received by the present device, and such an element may then relatively easily identify sessions going to and from the device, which do not comply with the limitations of the profile. There are a number of cases including the following:

1. Messages going from the current IoT device to destination IP addresses different from those pre-provisioned as allowable for the device,
2. Messages going to the current IoT device from source IP addresses which are not defined as allowable sources, and
3. Messages going either to or from the current IoT device which have a format that differs from the allowable formats defined in the profile. For example, a message may have a length which is different from that defined in the profile.

The GPT monitoring platform 34 may monitor all the data associated with the device. As discussed the monitoring platform may be either a GTP-Relay/Proxy or a GTP-Probe, and typically the platform monitors the GTP-U (User Plane) messages.

Figure 4:
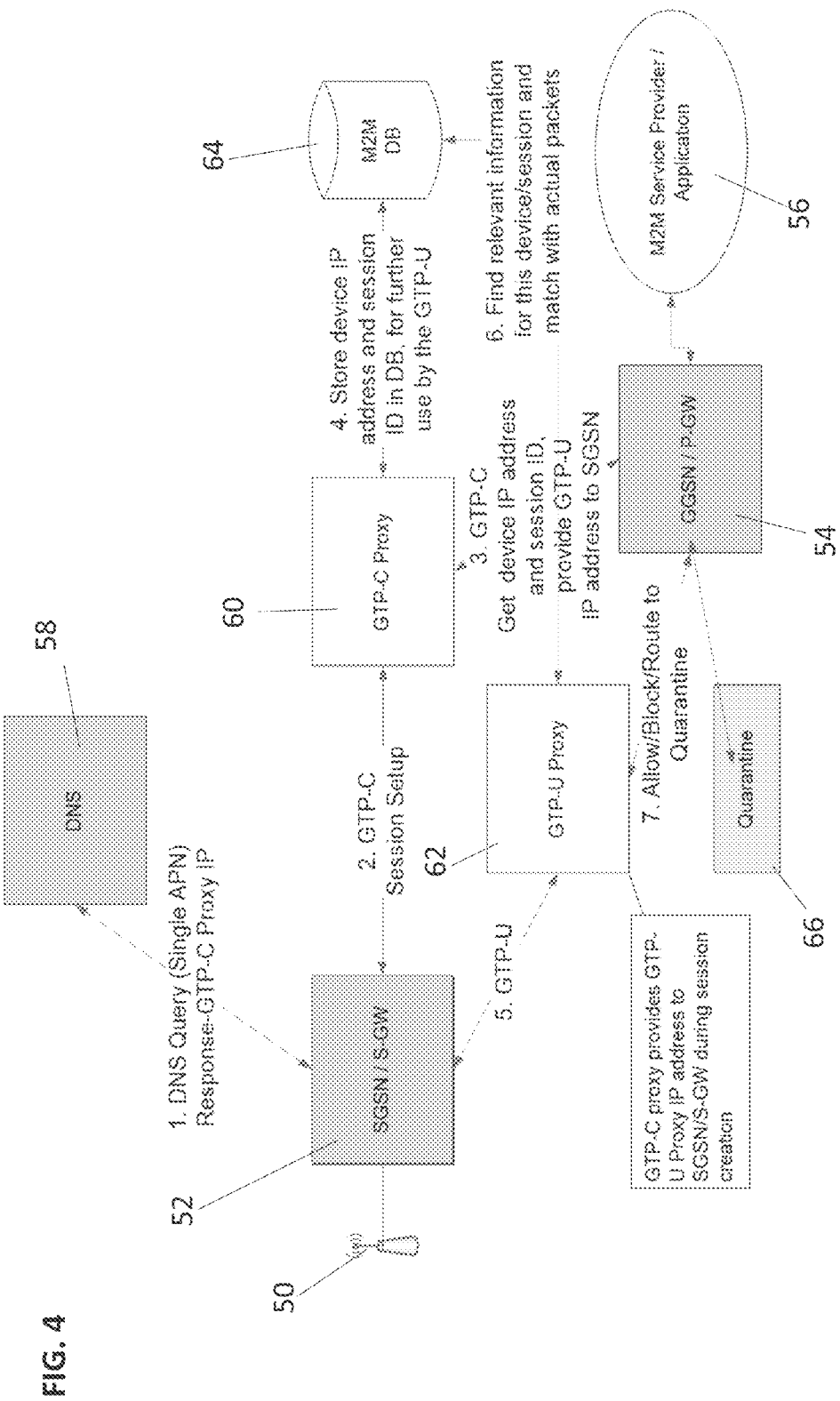
FIG. 4 is a simplified block diagram illustrating an implementation of the embodiment of FIG. 2 using a proxy.

Reference is now made to FIG. 4, which is a simplified diagram showing a GTP-U proxy which monitors the user plane messages as a proxy. IoT device 50 connects through the cellular network to SGSN or S-gateway 52, where the GTP tunnel is set up to GGSN or P-gateway 54. From the GGSN 54, the session connects via the Internet to the M2M service provider or application 56 with which the IoT device 50 is communicating. Dynamic name server (DNS) 58 provides IP addresses in general, and GTP-C (GTP control plane) proxy 60 carries out session setup. Session setup includes telling the SGSN to use the IP address of GTP-U proxy 62, thus allowing GTP-U proxy 62 to receive all of the user plane data. The device IP address and session ID—typically but not necessarily the IMSI, are paired together, and the session ID is used to obtain the device profile from the M2M database 64. The GTP-U proxy 62 is able to obtain a device profile for each communicating IoT device and check each session packet against the appropriate device profile to determine compliance. The packet may then be allowed, blocked or routed to quarantine 66.

As shown in FIG. 4, the GTP-U 62 carries out the enforcement. In other embodiments, separate enforcement units may be provided, including firewalls located outside the cellular network.

For full control of the GTP-U messages, meaning all of the actual data going from/to the device, the GTP-C Proxy/Relay 60, which controls the GTP-C (control plane) messages—such as the Create-PDP-Context, may provide the IP address of a GTP-U Relay/Proxy as the GTP-U destination for those specific sessions (in the Create-PDP-Context response), as mentioned above and shown as item 3 in FIG. 4. Hence the GTP-U Relay/Proxy 62 becomes another component of the GTP platform as a whole, and may thus intercept and match all related messages and test them for the above described three conditions.

In one embodiment, an interface between the GTP-C 60 and the GTP-U 62 components may be implemented over the database 64. The GTP-C component 60 may store all the relevant information in the database 64, along with the session ID or any other identifier from the control session that is related to the GTP-U session. The GTP-U unit 62, which no longer has the IMSI or other information that identifies the current IoT device 50 directly, may use the session ID identifier from the database 64 or the other relevant identifiers of the session in order to access the security rules that are relevant for the current session and stored in the database 64. Alternatively, an API (a direct application interface) may be implemented between the GTP-C 60 and the GTP-U 62 components, in the same way that such interfaces may be implemented between the GTP-C 60 and external security systems, as described in the following.

The GTP-U component 62 may block the suspicious messages, or alternatively route them to a Quarantine server 66, for further inspection.

The embodiment of FIG. 4 may therefore provide an interaction between three particular components to match the IoT device to the session and control the session to protect the device. These components are the GTP-C relay proxy 60, the device security profile provided by the device operator and indexed, using the IoT device IMSI, and the GTP-U relay proxy 62, which checks the messages and enforces the profile.

Figure 5:
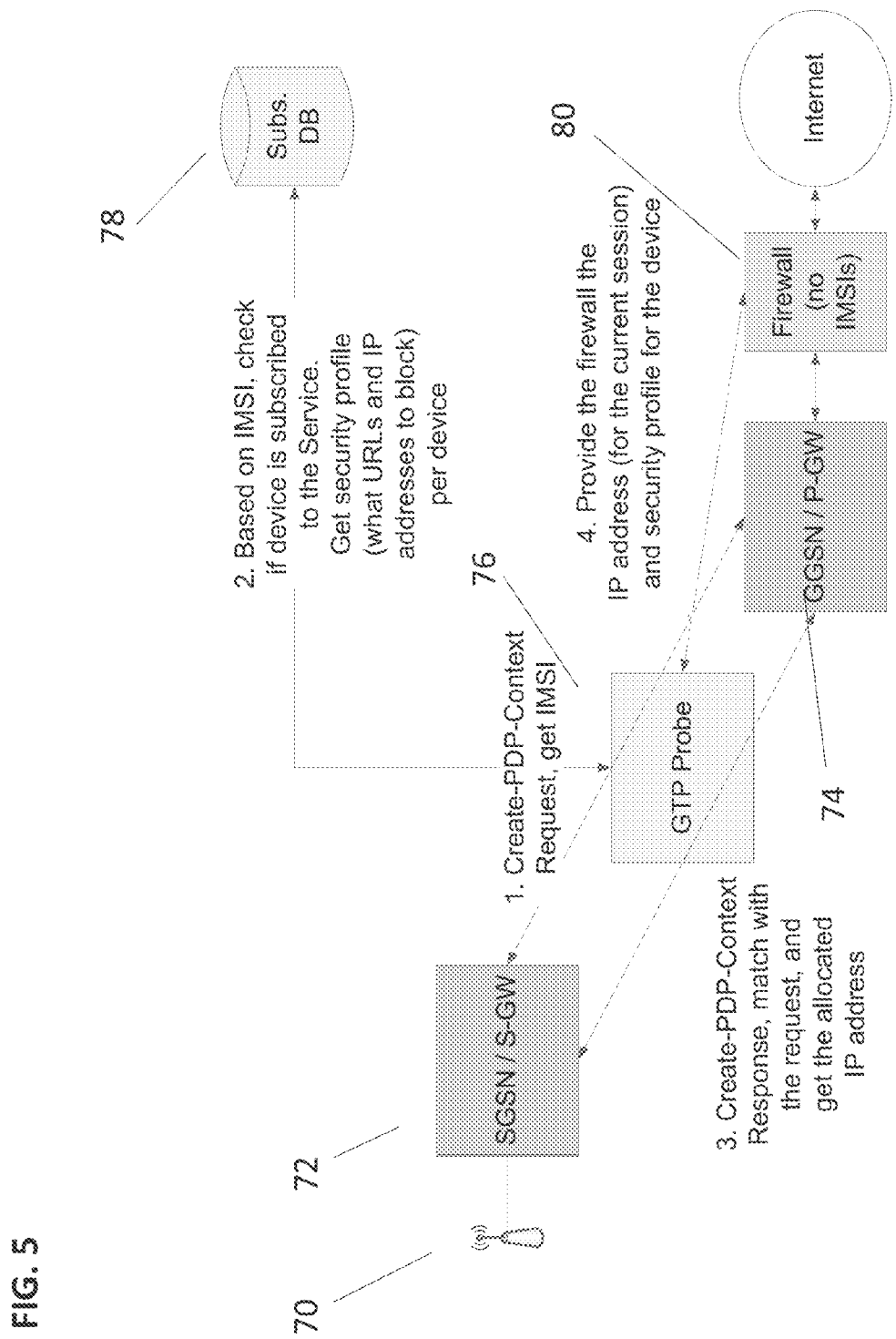
FIG. 5 is a simplified block diagram illustrating an implementation of the embodiment of FIG. 2 using a probe.

Reference is now made to FIG. 5, which illustrates a further embodiment in which a GTP-U probe carries out monitoring only of the IoT device data messages. IoT device 70 connects to the cellular network and to SGSN or S-gateway 72. A GTP tunnel is set up as before to GGSN or P-gateway 74. GTP probe 76 monitors the traffic in the tunnel and uses the IMSI of the device to determine whether the session is an IoT session that is to be monitored. If so, the appropriate device profile is obtained from database 78, and sent to firewall 80 along with details of the IP address of the device 70. The firewall inspects all the packets associated with the IP address and checks them in accordance with the profile provided.

Thus, routing of the GTP-U messages may be made as before, by the GTP-C-Relay/Proxy, so only the data of the relevant devices may be monitored. Alternatively, all GTP-U messages in the network may be monitored, in particular if there is no GTP-C-Relay/Proxy, as in the case illustrated in FIG. 5. In that case, the GTP-U component 74 may be a dedicated GGSN system of the network, so the relevant traffic may be distinguished from all other network traffic.

Thus, in one embodiment, the probe-based system may have the following components:
1. GTP-C Relay/Proxy (not shown)
2. The device profile, containing the information provided by the IoT operator, which may be indexed by the IMSI or any other mobile network device identifier.
3. GTP-U probe 76 which monitors only the relevant devices.

Another alternative is the case where there is no GTP-C Proxy/Relay at all, but only a probe. In that case, the system may be composed of:
1. GTP-U probe 76, and
2. The device profile, containing the information provided by the IoT operator, which may be indexed by the IMSI or any other mobile network device identifier.

In the case of the simple probe 76 as illustrated in FIG. 5, there are no GTP-C and no GTP-U servers. A probe is located between the SGSN 72 and the GGSN 74, which probe monitors all passing traffic. The probe may close transactions, that is, the probe may see the Create-PDP-Context message that goes towards the GGSN 74 during the setup of the session, and may further see the response from the GGSN to the SGSN, which contains the IP address allocated to the device. At this point the probe has the IP address, and the IMSI, and can combine and send the pair to the database and firewall to provide the required information for enforcement.

When using a GTP-C, whether with the GTP-U proxy 62 of FIG. 4, or with the probe 76 of FIG. 5, one or more specific APNs may be provided on the IoT device itself, and may be used to route to the GTP-C, only relevant traffic. The APN (Access Point Name) is usually translated by the DNS 58 to resolve to the address of the GGSN 54 or 74. Thus, specific APNs on the IoT devices may be translated to resolve to the GTP-C address, instead of the network GGSN. Thus the GTP-C receives only the sessions that relate to IoT that are subscribed to the service, and does not have to deal with all traffic. The APN may need to be updated on the IoT device itself, but this can be done via OTA (Over The Air) interfaces, so it is not a manual operation.

A benefit of using a GTP-C and a GTP-U proxy is that the GTP-C can route the traffic to a dedicated GTP-U which may examine traffic for the relevant devices. Thus different levels of service may be provided to different devices, and APN's may define devices say requiring higher levels of security.

Thus two alternatives are provided, the GTP—proxy relay and the GTP probe.

The proxy terminates the connection as if it is the destination end, and then emulates the beginning. A proxy may separate the IoT traffic into a separate tunnel from other GPRS data, and may allow a choice as to which firewall to send data of a specific IoT device or specific provider to. Thus it is possible to make use of dedicated firewalls or dedicated ports for IoT traffic. For example IoT devices that need monitoring may be sent to a firewall that is able to implement the dynamic applicative firewall, and thus enforce the dynamically provided device profiles. If the GTP-U is the enforcement device then the session can be sent to a specific GTP-U. The GTP-U may allow for deep packet inspection, which allows greater complexity of the rules provided in the device profile.

The GTP probe sees data but in read only mode, so that the probe is unable to change either the content or the direction of the communication. Rather the probe sends information about the session to the firewall to enable the firewall to do the monitoring. The probe solution is easier to implement than the proxy relay.

An alternative embodiment does not monitor at the tunnel, namely it does not monitor the GTP protocol, but rather the Gi protocol, or equivalents, which relate to the stream of data on its way to/from the internet, on the Internet side of the GGSN or the P-Gateway. At this point, the data forms an IP stream, after removing the GTP envelope. The system may be located then on the border of the mobile network, for example at a DPI or a firewall, or any type of cyber security system which performs packet inspection. Alternatively the inspection can be located in the cloud, and the actual data can be routed to the system by defining a specific cloud location as a proxy IP, or by other means. In this case, the device identification information gathered from the GTP-C may be provided to that firewall or cloud location, instead of to the GTP-U controlling system.

It is pointed out that such a firewall system or a DPI, which already exists in many networks today, cannot of itself identify IoT device security issues, merely by identifying the source and destination IP addresses and by looking at the simple formats of the messages. The IP packets monitored by the Gi, after the GGSN, do not carry the IMSI or other mobile identifiers, and cannot be associated with the service provider and hence with the relevant information. Rather, as with the previous embodiments, the IMSI is used to provide a device identification and the database is then used to find a corresponding profile for the device.

In the present embodiment, the system may thus contain:
1. a GTP-C Relay/Proxy or a GTP-Probe;
2. The device profile, containing the information provided by the IoT operator, which may be indexed by the IMSI or any other mobile network device identifier;

3. An interface to an external system which may be achieved by providing access to the database or by APIs or by other means.

An additional component, which may be added to any of the above configurations, is a signaling blocking unit, and the unit may be connected to the core signaling of the mobile network. In the event of suspected hacking, the IoT device may be blocked for data services as a whole, say for a given period of time, rather than merely blocking the suspected data session. In general, blanket blocking may be for a temporary period, and in certain cases may be permanent. The blocking may be achieved by modifying the profile stored in the mobile network visitor location register (VLR) (in 2G/3G networks) or MME (in LTE networks). The profile can be modified by a MAP ISD (Insert Subscriber Data) message, or by the equivalent Diameter message (such as IDR or another), that can send a new subscriber profile to the MME or update the existing one.

Network Architecture

It is pointed out that the architectures shown in FIGS. 4 and 5 are just two examples of possible network architectures, and signaling flows, which can vary from operator to operator and from network type to another. In the architecture of FIG. 4, the GTP-C Relay/Proxy, the GTP-U Relay/Proxy and the M2M DB are three core components of the embodiment.

Figure 6:
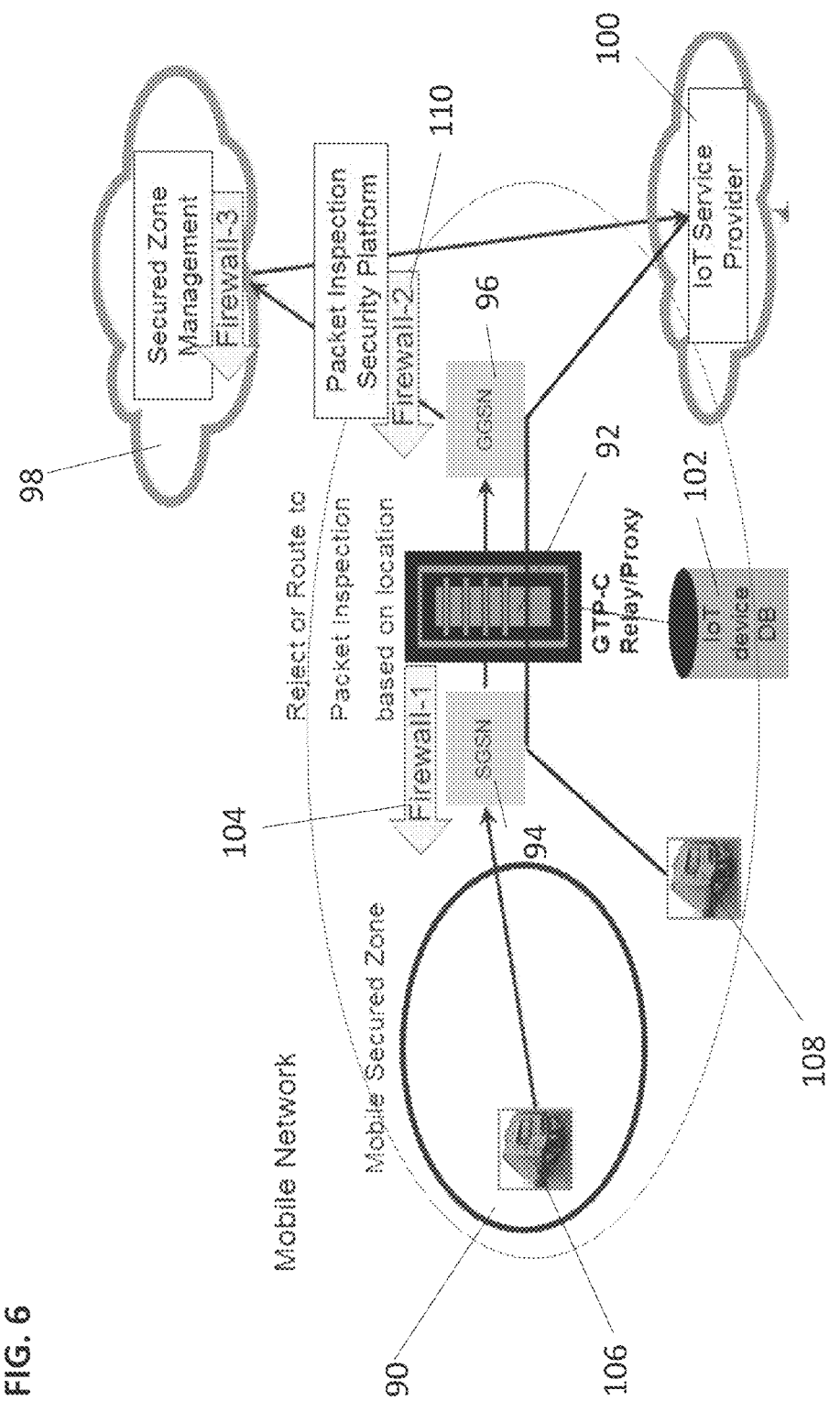
FIG. 6 is a simplified block diagram illustrating an embodiment of the present invention for protecting a defined area with multiple IoT devices.

Reference is now made to FIG. 6, which illustrates how the present embodiments may contribute to a mobile secure zone. The present embodiments identify individual IoT devices to the firewall components and are thus able to identify groups of devices if the groups are defined. Thus the embodiments may be used to isolate a sub-network in terms of security, creating mobile secured zone 90. The secured zone means that the data traffic associated with all IoT devices permanently located in the zone, other IoT devices visiting the zone, and potentially mobile subscribers visiting in a specific area can be isolated and proxied, that is to say re-routed to another security inspection platform, without modifying the final destination, for further security inspection. Optionally, the present embodiments can be used to block data sessions themselves, or they may simply provide the information and leave actual blocking to available packet inspection systems. The present embodiments may also block the device from further access to the network, temporarily or permanently.

In the embodiment illustrated in FIG. 6, a three level firewall is provided to defend the zone. It is noted that the three-level firewall is not specific to the zone implementation and that the architecture in FIG. 6 is general to all embodiments herein.

The embodiment related to in FIG. 6 refers specifically to a mobile GSM/3G network, but the same principles apply to LTE/4G, and CDMA networks, as well as other wireless network such as LPWAN (Low Power Wide Area Networks—e.g. LoRa, SIGFOX and others, where the data is transmitted via a network server to the internet. The GTP-C Relay Proxy 92 may serve as the monitoring platform, and may be located in the network between the SGSN 94 and GGSN 96, that is to say in the region of the GTP tunnel, as in the previous embodiments, so that it is able to monitor GTP traffic and determine which IoT sessions originate in the mobile secured zone. In particular the monitoring platform 92 is located before the network server which acts as a gateway towards the internet. In case of a 3G network the gateway towards the Internet is the GGSN 96. The Relay proxy 92 forwards sessions that belong to the secured zone to the triple firewall, including secured zone management third firewall 98, and the triple firewall applies rules based on packet inspection before allowing the session to continue to the destination, which may be the IoT service provider 100 but also may be a hacker attempting to take control of the device.

As before, IoT device database 102 obtains a specific profile for the device, but secure zone firewall 98 may apply additional rules that are general for the mobile secured zone.

The secure zone platform may control zone-relevant IP sessions through the GTP tunnel. Hence the relay proxy 92 is connected to the GTP data stream going between the SGSN and the GGSN, in a 2G/2G mobile network, or between the S-GW and the P-GW in an LTE network, or other parallel entities in other types of wireless networks, such as MIP/PMIP protocol in CDMA networks, or the LoRa/SIGFOX protocol connecting the gateways to the main server at the backend of the network.

The GTP-C platform 92 of the present embodiments may use any of the location indications provided to the network servers related to the location of the device. In case of LoRa for example, the device may need to periodically update the network about its location, regardless of any activation of a data session.

The GTP-C platform 92 may actually control only the signaling part of the data sessions, that is the GTP-C(Control plane). The actual data passes through a different channel known as the GTP-U (User plane), and may be inspected only for the relevant IoT suspected devices of the security zone. The data inspection may be carried by platforms that are capable of packet inspection such as the triple firewall.

The GTP-C proxy platform 92 may be able to control all signaling related to the data sessions going to and from a connected mobile IoT device served by the network. These data sessions are generally expected to connect the devices to the service provider of that device, but may also inadvertently connect the IoT devices to other sources, which may represent security threats. The mobile network, and particularly the GTP tunnel, is the pipe for all data affecting the IoT devices, and hence it is a significant location for raising security issues.

The GTP-C proxy platform 92 may also control all signaling related to the data sessions of the personal subscribers being served by the network. Since the platform controls the GTP-C only, the required capacity is not that large even if all network devices and subscribers are being monitored.

The GTP-C proxy platform 92 is an intrusive platform, which has control over all GTP-C messages, and can relay the messages to the SGSN/GGSN or block them, and may also modify the messages. GTP-C proxy platform 92 may exert control by entering the IP address of the firewall platforms, for example secured zone management platform 98 as the proxy for the messages, so that the responses to the messages may go also via the proxy and can also be inspected.

The idea is to monitor all requests for creating a new session. In the case of GTP, the request is in the form of a Create-PDP-request, and similar messages apply to other networks. Other access/network requests may contain the location of the device, such as periodic location updates in the LoRa network, and the platform may examine the location indication of the mobile device, which is provided in the session initiation request. The location may be in the form of a Cell-ID in a cellular 3G/4G network, but may be another type of location provided by the network. If the Cell-ID is a part of the secured zone, which information is pre-provisioned to the system, the initiation request is considered legitimate, and the initiation request may be relayed to the GGSN. If the Cell-ID does not belong to the secured zone, the session initiation may be rejected by the GTP-C Relay/Proxy as part of the "layer-1" firewall, 104, which relays/blocks session initiation requests.

In addition, the system may use Cell Triangulation techniques to better locate the device, by knowing the other cells around the device. Cell triangulation information may be received from the network, where neighboring radio antennas sense the devices before the strongest cell is selected. Location information may also be received by tracking the devices over time, receiving cell-IDs from previous data sessions, or periodically querying the HLR or the VLR for the cell ID, or using a location server provided by the mobile network. These methods may provide a more accurate location of the device, and an accurate location may assist in determining whether the device belongs to the secured zone or not. In this way, the present embodiments extend not just to static IoTs permanently located within the zone but also to mobile IoT's such as trucks 106 and 108, and enable the system to distinguish between truck 106 which is within the zone and truck 108 which is outside the zone.

After the session initiation request has passed the layer-1 security level and firewall 104, the system may route the actual data, not the initiation request, which is a GTP-C (Control Plane) request, but the following GTP-U (User Plane) stream, for further packet inspection at layer-2 110 and layer-3 98 levels of security. These additional layers are not mandatory but additional features of the system. The routing of the actual data session via the packet inspection system may be done by either returning an IP address which is associated with a dedicated GTP-U destination (a dedicated GGSN for security purposes), or by dynamically changing the APN (Access Point Name) for the session, which may be translated later into a dedicated security platform located elsewhere in the network premises, or in the cloud or in the Internet. The data stream may be transferred to the security platform over a VPN channel, or other secured channel. The security platform may examine the actual packets of the data session, as long as the session exists, and determine whether to block the session at any given point of time, or raise alerts, or allow the data to reach its original destination. Similarly, data which is streamed from external sources to the mobile devices may pass via the same security platform, as it is a part of the same bi-directional data session.

The GTP-C proxy platform 92 is associated with database 102 of IoT device related information, as discussed above, and the database may also contain the secured zone locations, as indicated in the above. The database may contain the mobile identifier, which is typically the IMSI but may be any other identifier that can be fetched from the GTP-C signaling, as well as information related to the service provider, and the secured zone locations associated with the current device. The GTP-C relay/proxy 92 may fetch the IMSI from the data session initiation messages, and access the database to determine whether the current session should be routed for further data inspection.

The GTP-C relay/proxy 92 may also determine that the current device is not allowed at the current location, and block the session immediately, without further routing to a security platform. Such a level of determination, at the GTP-C Relay/Proxy forms the layer-1 GTP firewall 104 for the secured zone, while the packet inspection is a layer-2 firewall 110. Additionally, the packet inspection platform can route the data, after being inspected, to the Secured Zone management Platform 98, which is a platform that carries out specific management tasks relating to security in the zone, say for example an airport. The platform 98 may be the final destination of the data session if the IoT device is part of the security of the secure zone, or the data can be routed to its original final destination, say an IoT device or even a personal mobile telephone, which is currently visiting the zone, but is not an integral part of it as shown by truck 106.

As discussed, for the blocking of the data session, the combination of layered firewalls may block data sessions by itself, by rejecting the session initiation request. The firewalls may also block the device from further access to the network, temporarily or permanently. Such blocking may be done by modifying the subscription profile directly in the VLR or the MME, via MAP ISD (Insert Subscriber Data) message or the equivalent Diameter messages in the LTE network, such as the IDR message. The blocking in the profile is an optional feature of the system.

Another feature of the system is to query a visitor for a username/password, while the user is trying to initiate a data session while being in the secured zone. The data session can be routed to a server which may open a web portal, and request user identification. Another option to achieve the same result is to send the user a mobile push notification with an identification request.

The network architecture shown in FIG. 6 is just one example for possible network architectures and signaling flow, which may vary from operator to operator and across different network types.

FIG. 6 shows three layers of security, firewall 1, firewall 2 and firewall 3. The present embodiments describe the system and method for level-1 security, provided by the GTP-C relay/proxy 92 and its associated database 102. In addition, the additional level-2 and level-3 security layers are described in relation to the routing of the data stream into separate intermediate destinations for further security inspections.

The figure illustrates a truck 106 visiting in the secured zone, and also another truck 108 which is outside of the secured zone, and both of which have associated IoT devices.

Figure 7:
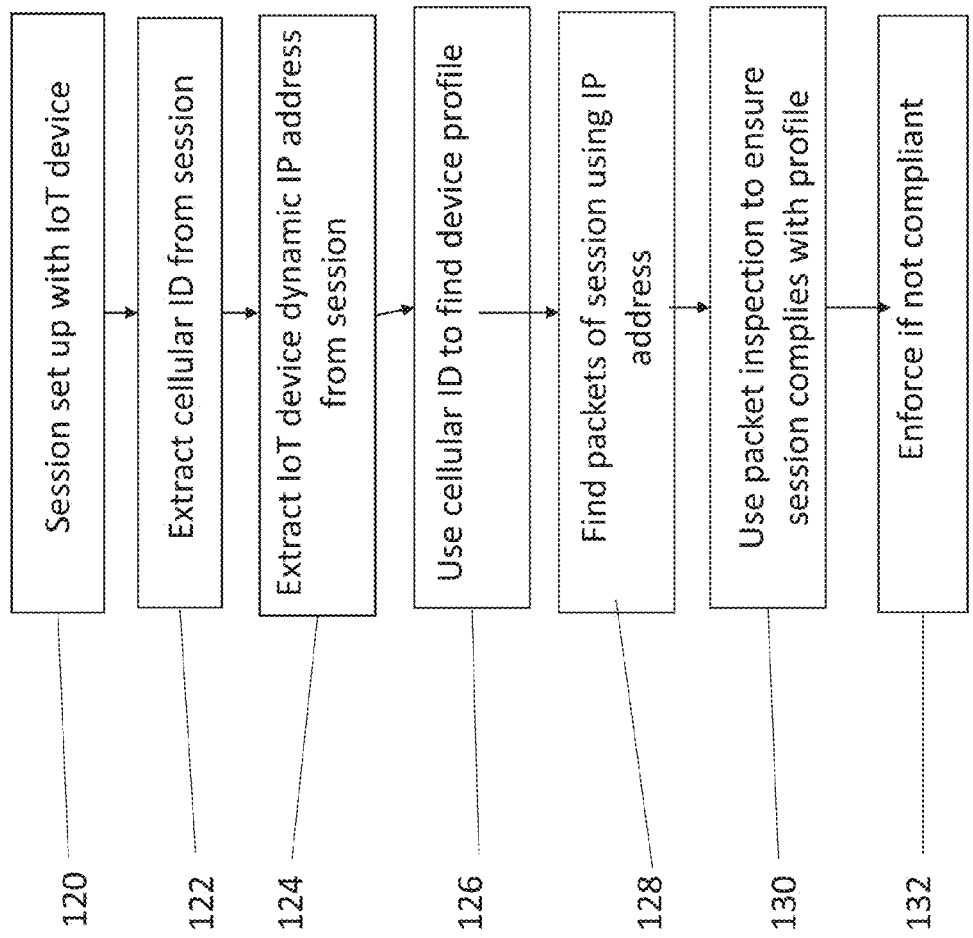
FIG. 7 is a simplified flow chart illustrating use of the embodiments of FIGS. 2 to 6.

Reference is now made to FIG. 7, which is a simplified flow chart showing a method of securing IoT devices communicating via IP based data sessions identified by IP addresses, and where the sessions pass at least partly over cellular networks in which the devices are identified by a cellular identification such as an IMSI. The first part of the method involves setting up a communication session that involves the IoT device, as shown in box 120. The session may be set up at the initiation of the IoT device or at the initiation of any outside networked entity requesting to communicate with the IoT device, including the IoT device service provider, a user interface for the device, any other machine or person having a legitimate reason to communicate with the device, other devices erroneously connecting to the IoT device and attackers.

Box 122 indicates extracting a cellular identification of the IoT device through the set up of the session. On a GSM network, the cellular identification is the IMSI. Box 124 indicates extracting an IP address. The IP address is typically dynamically assigned to the IoT device for the session, and provides a way of identifying packets that belong to the session. Box 126 indicates using the cellular ID to find the device security profile. The cellular ID uniquely identifies the device and thus uniquely identifies the profile. Meanwhile in box 128, the IP address is used to identify the packets belonging to the session. These packets may be inspected in box 130 to find out whether the device profile is being complied with or not. Box 132 indicates enforcement action being taken in the case of non-compliance. Enforcement action may involve the packets of the session being blocked, or put into quarantine pending further investigation. Alternatively, as mentioned, access to the device may be blocked altogether, either temporarily or permanently. Blocking may be selective, say everything may be blocked except for the server of the service provider.

It is expected that during the life of a patent maturing from this application many relevant IoT devices and cellular network generations and different types of connections and servers will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention, and all the combinations and sub-combinations are to be considered as explicitly written out in the present description. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. System for monitoring of IoT data traffic between an IoT device connected via a cellular network and a server using Internet Protocol (IP), comprising:
    at least one network server on the cellular network configured to extract cellular identification of an IoT device involved in a data communication session over said cellular network, and to extract IP identification of the data communication session and match the cellular identification with said IP identification;
    a database comprising device security profiles of IoT devices, and configured to allow a security profile corresponding to a current IoT device to be retrieved from said database via said cellular identification; and
    an enforcement unit configured to allow respective traffic in said session of said current IoT device, said session being identified by said Internet protocol identification, only if said traffic conforms with said device security profile retrieved by said database using said cellular identification and not to allow respective traffic in said session if said traffic does not conform with said device security profile.

2. System according to claim 1, wherein said security profiles define at least one member of the group consisting of:
    IP addresses to whom the IoT device is allowed to connect;
    IP addresses to whom the IoT device is allowed to provide write access;
    IP addresses to whom the IoT device is allowed to provide read access;
    Allowed message lengths;
    Allowed message formats;
    Allowed instructions;
    Allowed message content;
    Disallowed message content; and
    Allowed connection durations.

3. System according to claim 1, wherein said at least one network server to extract cellular information is connected to a tunnel between first and second data traffic gateways of said cellular network.

4. System according to claim 3, wherein said first gateway is an SGSN or an S-Gateway, said second gateway is a GGSN or a P-gateway, and said tunnel is a GPRS tunneling protocol (GTP) tunnel.

5. System according to claim 3, wherein said first and second data traffic gateways are on a single cellular network.

6. System according to claim 3, wherein a first of said data traffic gateways is on a roaming network of said IoT device and a second of said data traffic gateways is on a home network of said IoT device.

7. System according to claim 3, wherein said at least one network server to extract said cellular identification and connected to said tunnel comprises a probe.

8. System according to claim 3, wherein said at least one network server to extract cellular identification and connected to said tunnel comprises at least one proxy server.

9. System according to claim 8, wherein said at least one network server to extract cellular identification comprises a first, control plane, proxy server.

10. System according to claim 9, wherein said first, control plane, proxy server, interfaces with said enforcement unit.

11. System according to claim 9, further comprising a second, data plane, proxy server configured to intercept data packets of a session identified by said control plane proxy server.

12. System according to claim 9, wherein said first, control plane, proxy server is configured to obtain said cellular identification and the IP identification and said second, data plane, proxy server is configured to extract session data, said second, data plane, proxy server acting as said enforcement unit for enforcing of said security profile on said session data.

13. System according to claim 9, wherein at least some of said IoT devices are provided with access point names (APN), the system being configured to resolve said APNs to identify a proxy server within said system.

14. System according to claim 1, wherein said cellular identification is an International Mobile Subscriber Identity (IMSI) and said IP identification is an IP address assigned to said IoT device.

15. System according to claim 1, wherein said enforcement unit comprises an Internet firewall, the firewall being configured to apply dynamically supplied rules to an identified session.

16. System according to claim 1, wherein respective IoT devices are allocated data sessions via dynamically assigned Internet protocol addresses.

17. System according to claim 1, further configured to group IoT devices within a predefined zone and to constrain communication devices within said zone according to a predefined zone security profile.

18. System according to claim 17, configured to identify IoT devices belonging to said predefined zone according to a predetermined indication and further IoT devices not indicated by said predetermined indicator but being located within a geographical boundary of said zone.

19. System according to claim 18, configured to use cell identification to find a location of a mobile or IoT device and determine whether said device is within said zone.

20. System according to claim 19, wherein at least some of said IoT devices are provided with an APN that resolves to a control plane proxy server.

* * * * *